(12) United States Patent
Drosch

(10) Patent No.: US 8,612,708 B2
(45) Date of Patent: Dec. 17, 2013

(54) HARDWARE DATA PROTECTION DEVICE

(76) Inventor: Klaus Drosch, Järfälla (SE)

( * ) Notice: Subject to any disclaimer, the term of this patent is extended or adjusted under 35 U.S.C. 154(b) by 72 days.

(21) Appl. No.: 12/737,010

(22) PCT Filed: May 29, 2009

(86) PCT No.: PCT/SE2009/000280
§ 371 (c)(1),
(2), (4) Date: Dec. 1, 2010

(87) PCT Pub. No.: WO2009/148374
PCT Pub. Date: Dec. 10, 2009

(65) Prior Publication Data
US 2011/0082993 A1    Apr. 7, 2011

(30) Foreign Application Priority Data
Jun. 2, 2008 (SE) ........................ 0801295

(51) Int. Cl.
*G06F 12/00* (2006.01)
(52) U.S. Cl.
USPC .................................. 711/163; 711/E12.069
(58) Field of Classification Search
USPC ........................................................ 711/163
See application file for complete search history.

(56) References Cited

U.S. PATENT DOCUMENTS

| | | | |
|---|---|---|---|
| 6,345,346 B1 | 2/2002 | Biessener et al. | |
| 2004/0083383 A1 | 4/2004 | Carmona | |
| 2006/0137013 A1 | 6/2006 | Lok | |
| 2008/0018927 A1* | 1/2008 | Martin et al. | 358/1.15 |

FOREIGN PATENT DOCUMENTS

| | | |
|---|---|---|
| JP | 10-049365 | 2/1998 |
| JP | 2002-268828 | 9/2002 |
| JP | 2004-528651 | 9/2004 |

OTHER PUBLICATIONS

International Search Report.
European Search Report dated Aug. 2, 2011 issued in corresponding European Application No. 09758601.0.
Seth Vogle et al., "Shadow Independent Evaluation", http://www.voomtech.com/downloads/Shadow2/Evaluation.pdf, pp. 1-2 (Feb. 24, 2004).
English Translation of Japanese Office Action date Aug. 6, 2013, issued in Japanese Patent Application No. 2011-512409.

\* cited by examiner

*Primary Examiner* — Manorama Padmanabhan
*Assistant Examiner* — Hamdy S Ahmed
(74) *Attorney, Agent, or Firm* — Harness, Dickey & Pierce, P.L.C.

(57) ABSTRACT

A device is connected between an storage device controller and a storage device, providing data storage device protection in a manner transparent to the computing system and to the user of the computing system independent of operating system. The device protects the user from malicious code by preventing its execution and the unauthorized or unwanted user data modification by making the contents of one of the storage device read only. All the operations of the device are invisible to the computing system and to the user independent of installed operating system. The device can be disabled by a switch or by other means. When this happens the effect is the same as if the device were physically removed of the computing system.

11 Claims, 10 Drawing Sheets

COMPUTING SYSTEM WRITES DATA TO THE STORAGE DEVICE

COMPUTING SYSTEM READS DATA FROM THE STORAGE DEVICE

HARDWARE DATA PROTECTION DEVICE

BACKGROUND OF THE INVENTION/GENERAL PART

1. Field of the Invention

The present invention relates to data protection device, data modification prevention device, data modification prevention methods and data protection methods independent of operating systems.

2. Description of the Related Art

The present invention addresses the need for data protection where data protection means that there is data that cannot be modified in accidental or non authorized way, and that there is data that cannot be accessed by other than the authorized operator of the computing system. This definition of data protection can be divided in two requirements of protection: Data modification prevention and extraneous code execution prevention. The present invention implements both methods in one data storage protection device without regard to and/or the need for installed operating systems. We start by describing the current state with the first requirement: normally when there is data in a computing system that needs to be protected from accidental or unauthorized modification, said data is marked as "read-only", and the operation on it is limited by this characteristic. But this "marking" can be undone or simply ignored by software that does not conform to the operating system conventions or uses a different way of accessing this data on the data storage device used by said computing system. The solution to this would be to make the data storage device "read-only", in a manner similar to the working of a floppy disk, where a lever on its case allows or denies data modification on its magnetic surface. But this solution does work only for isolated data and it cannot be used when the data storage device also holds data that needs to be modified regularly, for example a directory index maintained by the operating system of the computing system. The second requirement, the extraneous code execution prevention, is currently addressed with a layer of software running as part of the operating system of the computing system, usually called "antivirus" and "firewall" software, depending on its operational and functional characteristics. This layer of software protects the data on a computing system by preventing execution of code that is not specifically part of the code that the user of said computing system is intending to use with its data. The problem with this approach to cover the second requirement is similar to what we specified for the first requirement: the software operation can be bypassed by software that operates not in conformance with operating system rules, or by software that operates using different access rules that the ones specified by the operating system. Well know examples of this are the "rootkits", pieces of software that operate in a lower level than the operating system, in a way that prevents its detection by the layer of software that implements the extraneous code execution prevention. A normal user is defenseless against this type of intrusion to the computing system.

SUMMARY OF THE INVENTION

In view of the situation presented above, we say that the object of the present invention is to guarantee that data in a computing system is protected against modifications and to prevent malicious code to execution operations on said system, operating in a manner that is transparent and invisible to the operating system and to the user, it is independent of operating systems. Furthermore, the present invention provides a data protection device that is connected between a data storage device and a controlling device that controls the storage device, in such a way that the data present on the data storage device is never modified. To maintain the correct operation of the computing system, the data protection device uses an auxiliary storage area that stores all data modifications. The data protection device implements an internal table that is used to keep track of the location of the modified data in the storage device. Every time the host system requests one or more sectors from the storage device, the data protection device will look-up in its internal table if a corresponding flag for that sector is set or cleared. If the corresponding flag is cleared, then the device will retrieve the sector or sectors from the storage device. If the corresponding flag is set, then the device will retrieve the sector or sectors from the auxiliary storage area. Furthermore, every time the computing system transfers one or more sectors to the storage device, the data protection device will redirect the sector or sectors to the auxiliary storage area and it will update its internal table, setting the corresponding flag for the sector number that was written to the auxiliary storage area.

Furthermore, the data protection device provides protection against malicious code, forbidding its execution. The data protection device prevents code execution when the code is read from the auxiliary storage area and from the BIOS. If the code is read from the secure data storage device it is executed normally. The data protection device has a scan unit that scans the data read from the auxiliary storage area to find patterns of bytes that determine that the data can be executed by a given micro processing architecture. The selection of the micro processing architecture and the patterns associated with it are loaded to the data protection device in factory. If the scan unit finds the byte pattern, the data protection device can either replace the data being read with a predefined value or it can signal the controlling device of the computing system that it has aborted the data transfer. The utility of the execution prevention capability of the data protection device of the present invention resides that to execute extraneous code, this code will have to be stored on the auxiliary storage area, as any new data that is being entered to a computing system equipped with the data protection device of the present invention.

The internal table of the data protection device is non-volatile, for maintaining correct operation in case of power failure of the computing system or in case of the computing system being powered off. The data protection device can erase the contents of the internal table, clearing all the flags on it. This is equivalent to return the computing system to its original state, because all the data modifications will not be present anymore for reading by the computer system.

The data protection device can be enabled or disabled by means of a mechanical or electric or electronic switch. If the switch is in the "ON" position, the said device is enabled and operates according to the preceding paragraphs. If the switch is in the "OFF" position, the said device is disabled and it does not intercept any read or write operations, thus allowing reading and writing to the storage device. In this mode, the auxiliary storage area is not visible to the host computing system.

BRIEF DESCRIPTION OF THE DRAWINGS

The accompanying drawings, which are incorporated in and constitute a part of the specification, illustrate numerous embodiments, features, and aspects of the invention and, together with the description, serve to explain the principles of the invention.

DESCRIPTION OF THE EMBODIMENTS/SPECIFIC PART

Figure 1:
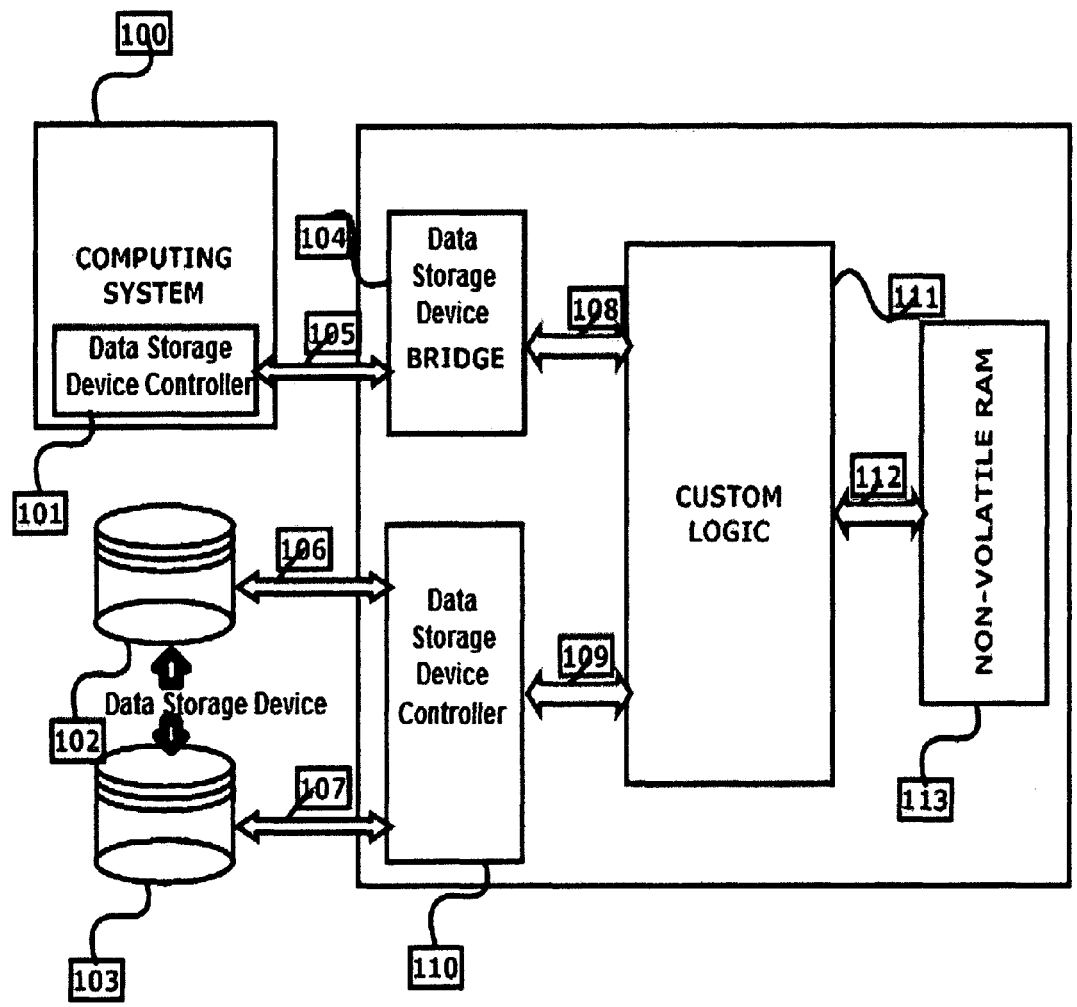
FIG. 1 is a block diagram showing a system in which a data protection device according to an embodiment of the present invention can be used.

The present invention will now be described in detail with reference to the drawings showing various embodiments thereof. In the drawings, elements and parts which are identical throughout the views are designated by identical reference numerals, and duplicate description thereof is omitted.

Now, an embodiment of the present invention will be described in detail with reference to the drawings.

FIG. 1 is a block diagram showing an example of a system including a data protection device that functions according to an embodiment of the present invention.

The following description will first be directed to an environment of usage of the data protection device according to the embodiment, then to the operations for protecting the data present on the data storage device of the computing system and for preventing execution of malicious code.
Environment of Usage of the Data Protection Device The FIG. 1 presents a possible embodiment of the data storage device. In this embodiment the data protection device 114 is connected to the DATA STORAGE DEVICE controller 101 of a computing system 100 through a DATA STORAGE DEVICE bus 105. The data protection device 114 has a bridge 104 that implements the I/F with the computing system 100 and its DATA STORAGE DEVICE controller 101. The bridge 104 communicates with the custom logic 111 that implements the functionality that is claimed in this patent through a standard data storage device bus 108. The custom logic 111 uses a non-volatile RAM 113 to store the table with the flags that indicate if a given sector is to be retrieved from the data storage device 102 or from the auxiliary storage area, that in the embodiment presented in FIG. 1 is realized by another data storage device 103 with equal size to the data storage device 102. In this embodiment, both storage devices use a DATA STORAGE DEVICE interface, and they are connected to the data protection device 114 through DATA STORAGE DEVICE buses 106 and 107. The data protection device 114 has a DATA STORAGE DEVICE controller 109 to realize the I/F with both storage devices. The custom logic 111 communicates with the DATA STORAGE DEVICE controller 110 through a bus 109.

Figure 2:
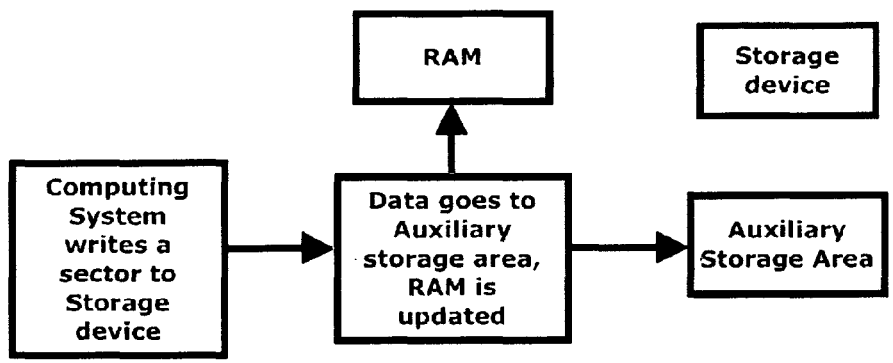
FIG. 2 is a diagram that shows how the data flows, depending if the computing system is transferring data to the data storage device (writing data), or transferring data from the data storage device (reading data).
Figure 2:
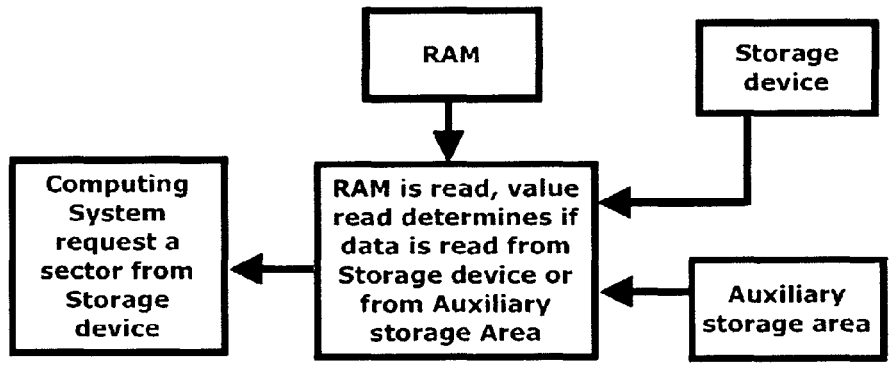

The data protection device 114 acts like a read switch, represented for clarity purposes in the FIG. 2, transmitting data written by the computing system 100 to the data storage device 103, setting a corresponding flag on the non-volatile RAM 113, and selecting the source of the data being requested by the computing system 100 according to the corresponding flag stored on the non-volatile RAM 113. If the flag is cleared, then the source of the data will be the data storage device 102, and if the flag is set, then the source of the data will be the data storage device 103.

Furthermore the data protection device 114 provides protection against malicious code by preventing data execution if this data is read from data storage device 103. To perform this function, the custom logic 111 scans the data read from data storage device 103 to find byte patterns that correspond to executable code for a given microprocessor. The custom logic 111 implements an internal table with the byte patterns against which it compares the data read from data storage device 103. If a match is found, the custom logic 111 replaces the contents of the buffer that contained the sector read with arbitrary data, being this arbitrary data or random data or a sequence of bytes with the same value (eg. 0×0). The custom logic 111 does not operate in this fashion when the data is read from data storage device 102. In this case, the data contained in the read buffer of the custom logic unit 111 is transferred to the computing system unmodified.

Figure 4:
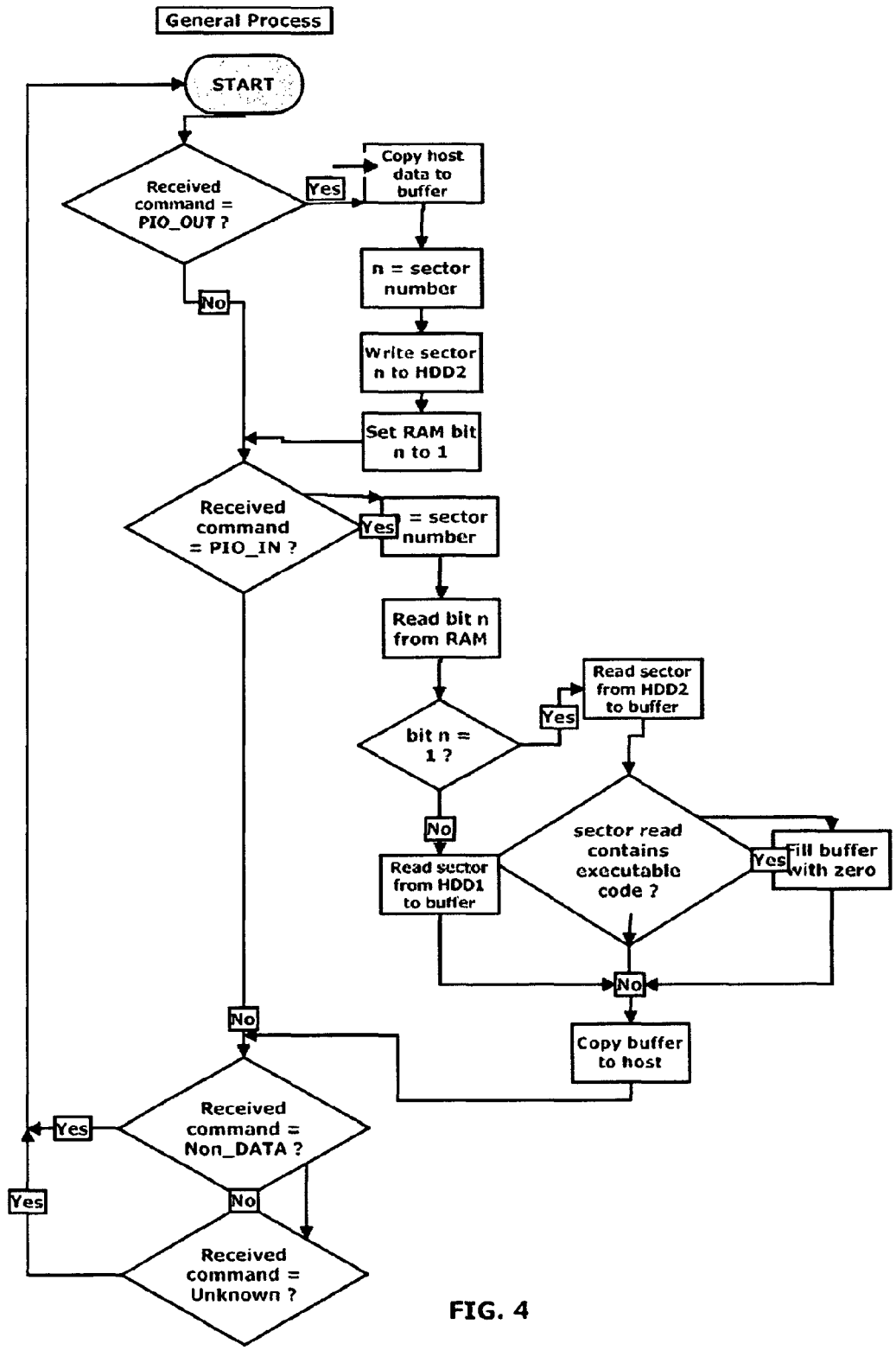
FIG. 4 is a flowchart showing an example of the data flow according to the characteristics of the data transaction that was requested by the controlling device of the storage device.
Figure 5:
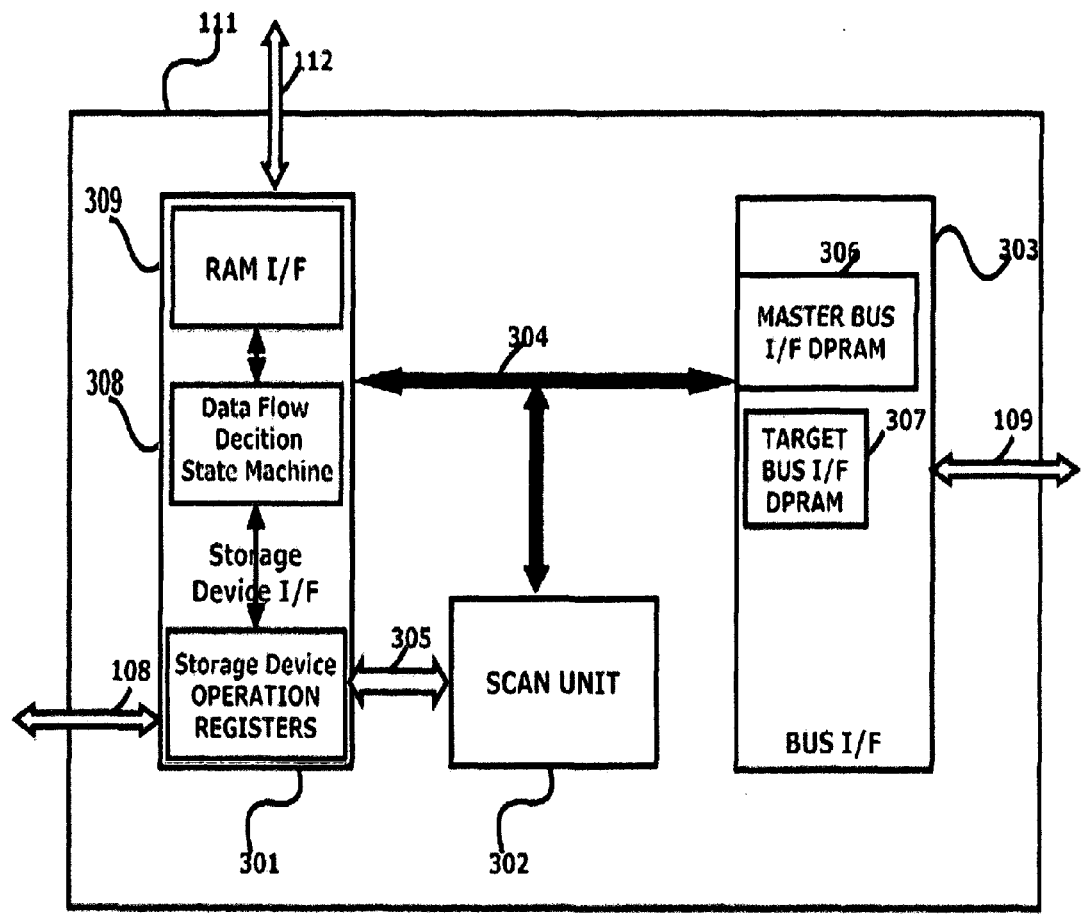
FIG. 5 is a block diagram of the custom logic unit 111.

For better understanding of the preceding paragraph, a flowchart of the operation of the data protection device 114 is depicted on FIG. 4.

DETAILED DESCRIPTION

Figure 3:
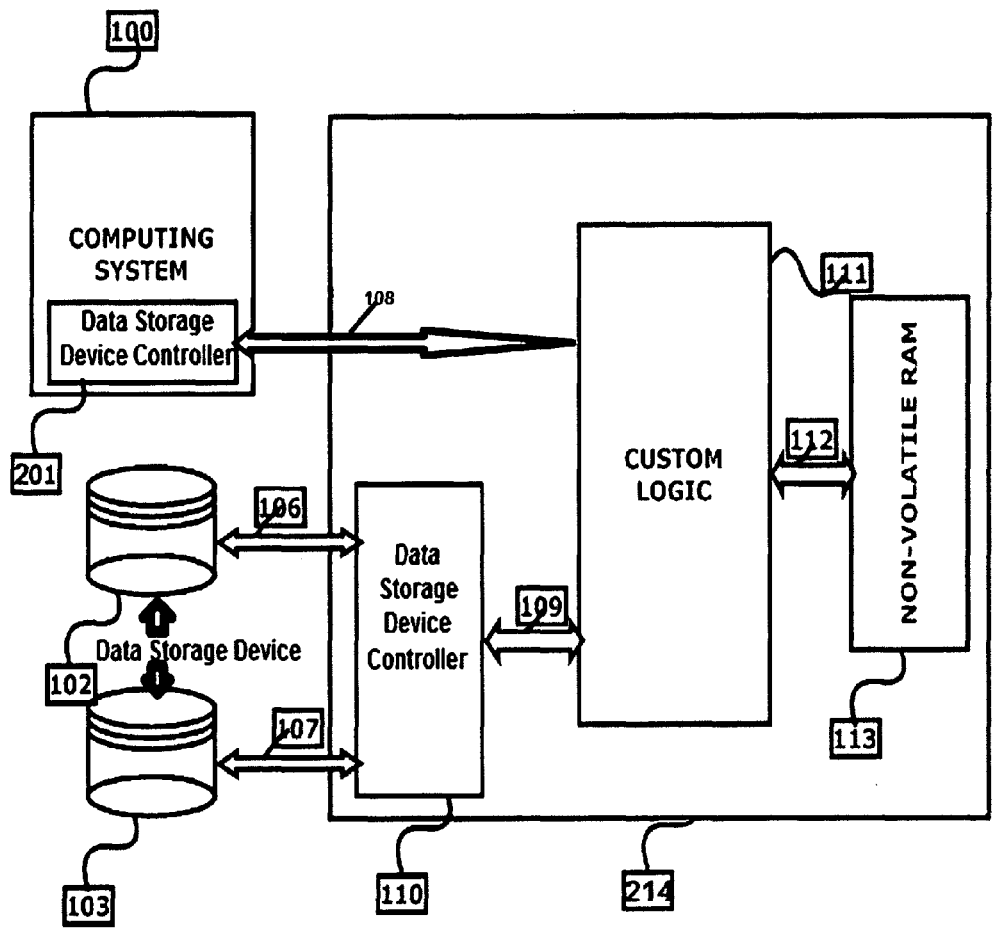
FIG. 3 is a block diagram showing the data protection system of the present invention in another embodiment.

The operation of the data protection device described in the present invention is defined by the custom logic unit 111, being its variations on embodiment only a function of the different interface types that a computing system and its storage units can use. The embodiments depicted in FIG. 1 and FIG. 3 show a possible use of the data protection device configured as having a DATA STORAGE DEVICE I/F (114) with the controlling device 101 of the computing system 100, or having the data protection device configured as having a data storage device I/F (214) with the controlling device 201 of the computing system 100. The custom logic unit 111 will have as its interface for all the different embodiments of this invention a standard data storage device interface 108 for communicating with the computing system 100 and also will have as its interface for all the different embodiments of this invention a standard BUS interface 109 with the DATA STORAGE DEVICE controller unit 110 that transfers data to or from the storage units 102 and 103.

Figure 6:
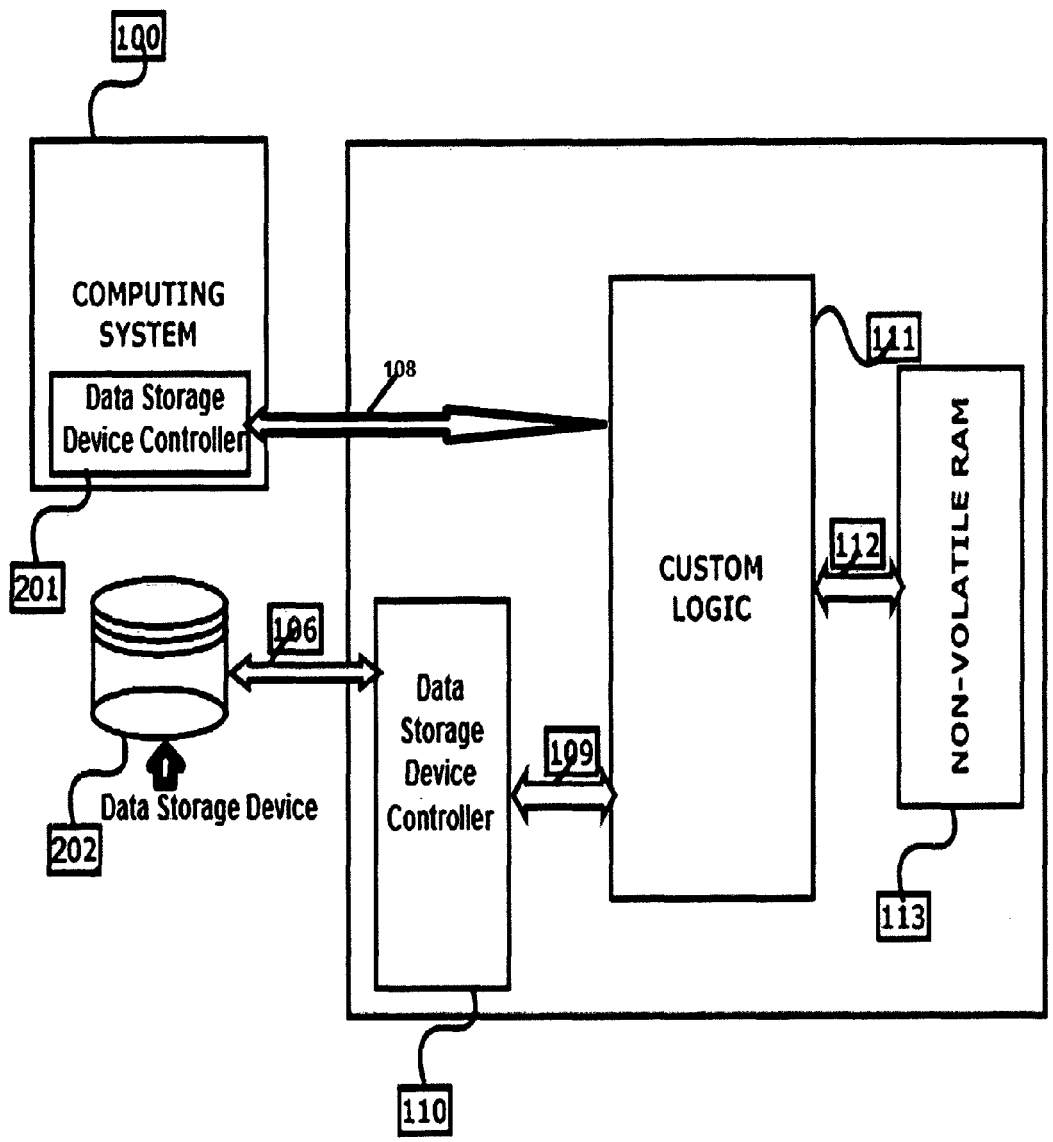
FIG. 6 is a block diagram showing the data protection system of the present invention in another embodiment.

Furthermore, it could be the case that an embodiment like the one depicted in FIG. 6 is used. In this embodiment, the data storage device and the auxiliary storage area needed for operation of the present invention are in the same physical device 202. In this case, the data protection device will divide the total storage area of the storage unit 202 in two parts, one being for the use of what should be the data storage device of previously mentioned embodiments and the other part as the auxiliary storage area.

The custom logic unit 111 has internally three units, the decision unit 301, the scan unit 302, and the BUS I/F unit 303. Scan unit 302 is connected to the same bus 304 that transfers data back and forth between the decision unit 301 and the BUS I/F 303. This allows the scan unit to search for matching between data read from auxiliary data storage device and its pre-configured byte pattern. The decision unit 301 implements a complex state machine 308. This state machine 308 will cycle through its states according to the DATA STORAGE DEVICE commands received through the DATA STORAGE DEVICE bus 108. Following are the cases of operation of the decision unit 301 according to the DATA STORAGE DEVICE command received through the DATA STORAGE DEVICE bus 108.

Figure 8:
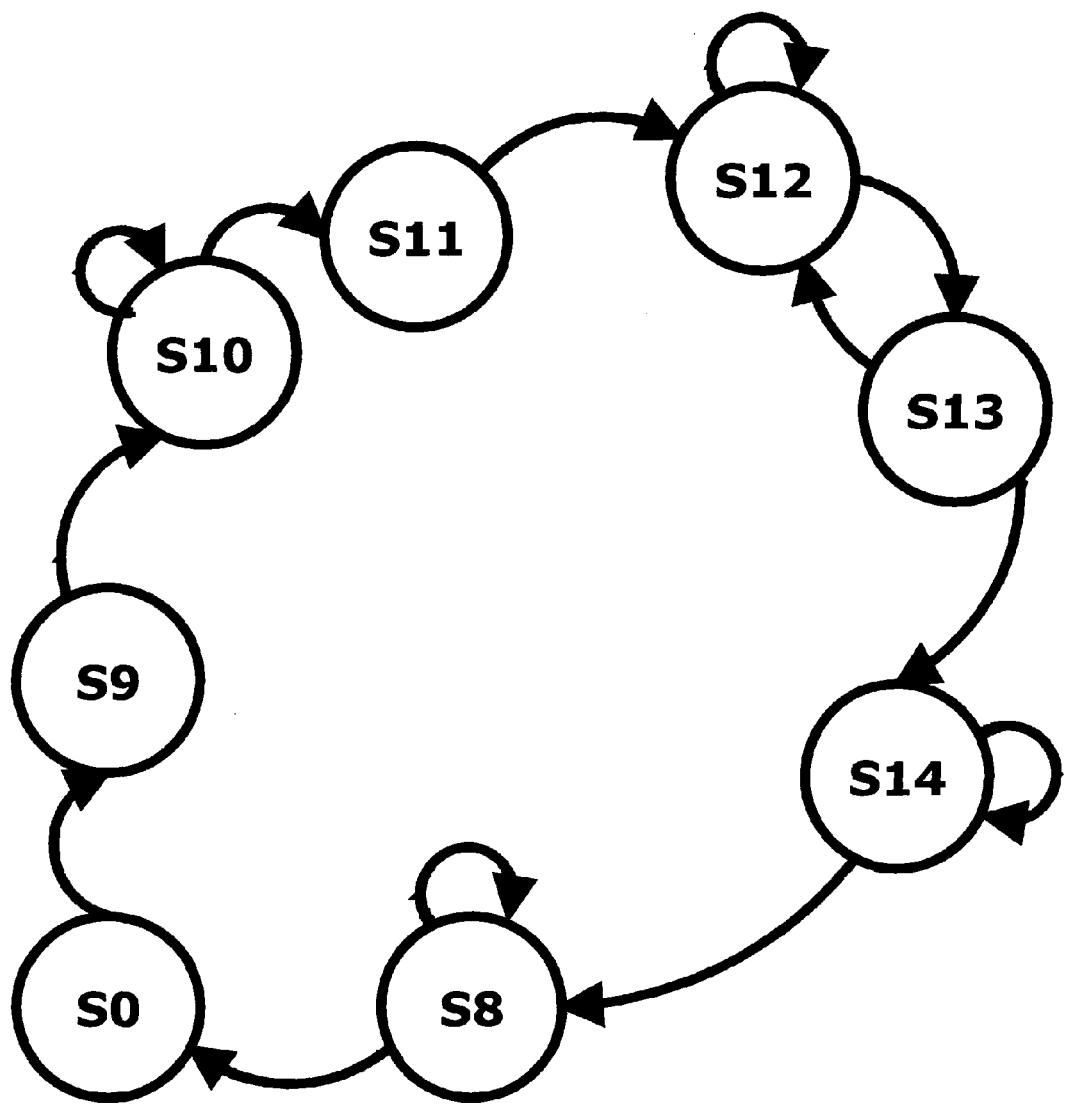
FIG. 8 is state machine diagram corresponding to the states of the decision unit 301 when receiving a PIO IN type data storage device command.

Case 1: DATA STORAGE DEVICE PIO IN/DMA IN Commands: As depicted in the FIG. 8, the decision unit 301 waits in state S0 until a command is received through the DATA STORAGE DEVICE bus 108. If this command is one of the following: READ DMA, READ SECTOR(S), IDENTIFY DEVICE, READ BUFFER, READ MULTIPLE, SMART READ DATA, SMART READ LOG SECTOR, the decision unit will enter in state S9 where it will signal the controlling device 201 (FIG. 3) or the DATA STORAGE DEVICE to DATA STORAGE DEVICE bridge 104 (FIG. 1) that the unit entered in a busy state, and it will read the non-volatile RAM 113 using the RAM I/F 309 at the address corresponding to the sector being requested as a parameter by the received data storage device command. The sector numbering scheme to be used with the present invention is LBA, where physical sectors of the data storage device are numbered consecutively from zero to the largest sector number allowed by the size of the storage unit divided by 512. The non-volatile RAM memory arrangement used with the present invention is particular to the characteristics of the devices used to build the data protection device in its different embodiments. The value read from RAM is then evaluated to determine from which storage area to retrieve the data required by the received data storage device command. The process of reading the block of data from the data storage device will result in selecting port 0 or port 1 on the DATA STORAGE DEVICE controller 110, accessed through the BUS I/F 303, thus selecting the data storage device 102 or the auxiliary data storage device 103. For the embodiment presented on FIG. 6 with only one data storage device 202, the port will be always 0 for the DATA STORAGE DEVICE controller 110, but the sector number will change to a value equal to the sector number originally requested by the received DATA STORAGE DEVICE command plus the half of the number of sectors that the data storage device 202 can hold. Is in this stage where the scan unit 302 operates, comparing the data read with a specific pattern of bits to detect if the data storage device contains potentially executable code. The scan unit 302 will do any of the following: a) leave data on buffer unmodified if it does not come from auxiliary storage area, b) leave data on buffer unmodified if this data is from the auxiliary storage area but does not match said pattern of bytes, c) fill the buffer with arbitrary data, being this random data or any value chosen beforehand. This operation occurs independently of the decision unit 301. The decision unit 301 will wait for the completion of the data reading process on state S10. When data reading is completed, decision unit 301 will sequence through states S11, S12 and S13, until all data on its internal buffer is transferred to the controlling device 201 of the computing system 100 or to the DATA STORAGE DEVICE to DATA STORAGE DEVICE bridge 104, depending on the embodiment selected for the data protection device. The decision unit 301, in state S14, can signal to the external I/F that it has finished transferring data. The last step is to enter in state S8, to clear all pending DATA STORAGE DEVICE flags and wait for the controlling device 201 or DATA STORAGE DEVICE to DATA STORAGE DEVICE bridge 104 to read its status register to end the transaction.

Figure 7:
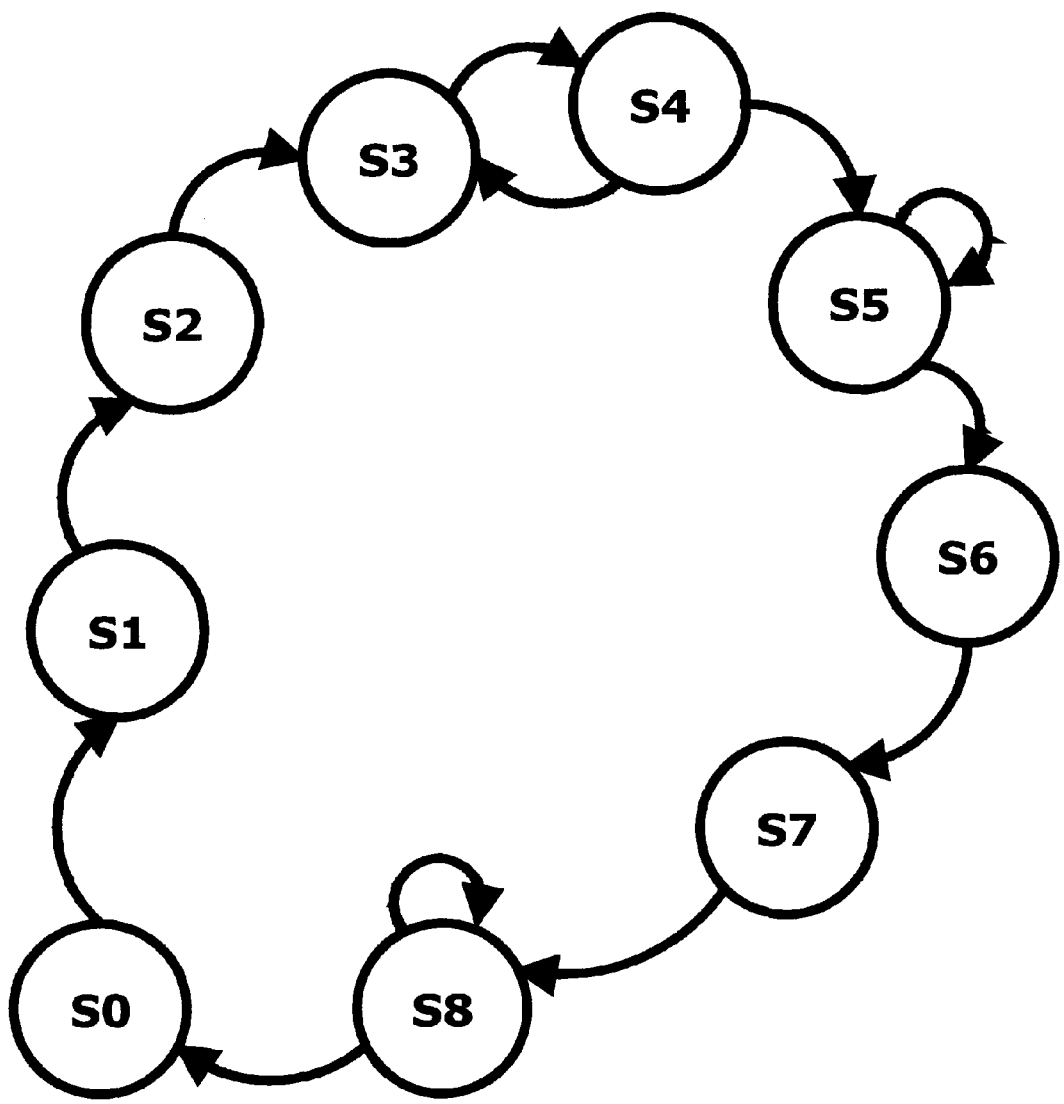
FIG. 7 is state machine diagram corresponding to the states of the decision unit 301 when receiving a PIO OUT type data storage device command.

Case 2: DATA STORAGE DEVICE PIO OUT Commands: As depicted in the FIG. 7, the decision unit 301 waits in state S0 until a command is received through the DATA STORAGE DEVICE bus 108. If this command is one of the following: WRITE BUFFER, WRITE DMA, WRITE SECTOR(S), WRITE MULTIPLE, the decision unit will enter in state S1 where it will signal the controlling device 201 (FIG. 3) or the DATA STORAGE DEVICE to DATA STORAGE DEVICE bridge 104 (FIG. 1) that the unit entered in a busy state. Immediately the decision unit 301 will enter in step S2, signaling that it can accept data through the DATA STORAGE DEVICE bus 108. After that, the decision unit 301 will sequence through the states S3 and S4, until a sector has been transferred (512 bytes). The next state, S5, will start the data transfer to the auxiliary storage area, using the BUS I/F 303 to communicate with the DATA STORAGE DEVICE controller 110. As stated in the preceding paragraph, the data can be transferred to a auxiliary data storage device 103 or to the same data storage device 202 where is the original data. The decision unit 301 waits on state S6 for the data storage device writing process to complete. The decision unit 301, in state S7, can signal to the external I/F that it has finished transferring data. The last step is to enter in state S8, to clear all pending DATA STORAGE DEVICE flags and wait for the controlling device 201 or DATA STORAGE DEVICE to another DATA STORAGE DEVICE bridge 104 to read its status register to end the transaction.

Figure 10:
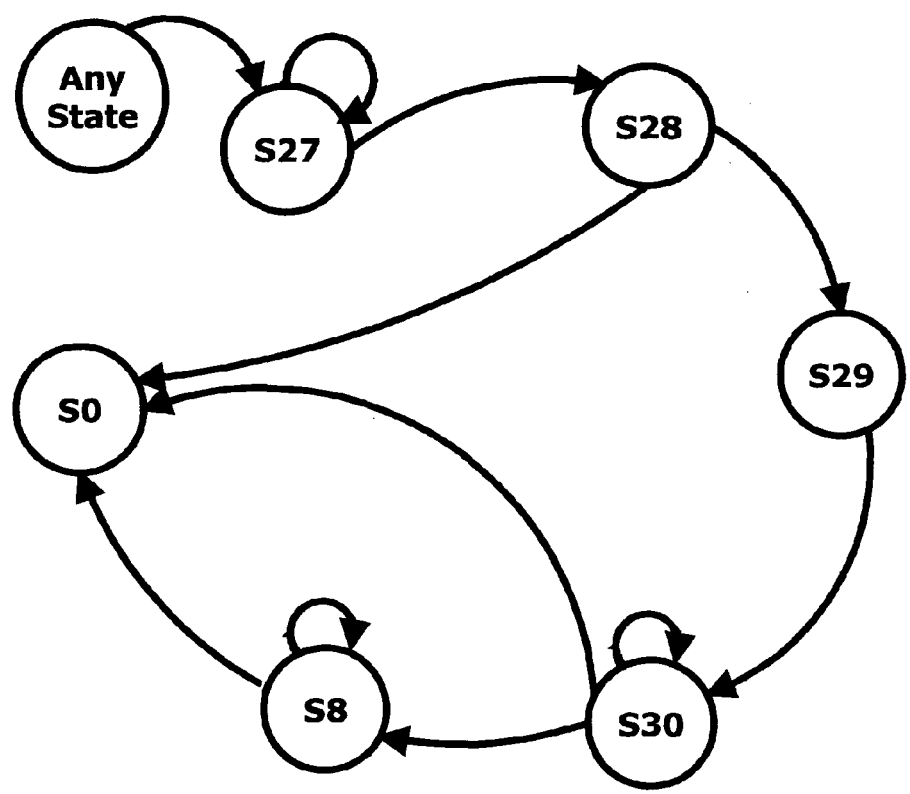
FIG. 10 is state machine diagram corresponding to the states of the decision unit 301 when receiving a Soft Reset signal from the data storage device bus 108.

Case 3: DATA STORAGE DEVICE Soft RESET: As depicted in FIG. 10, the decision unit 301, in case of an Soft Reset signal received through the DATA STORAGE DEVICE bus 108 consisting on a flag of the Device Control Register present on the DATA STORAGE DEVICE Registers bank 311, the decision unit will enter on state S27, where it will signal the controlling device 201 or the DATA STORAGE DEVICE to DATA STORAGE DEVICE bridge 104 that the custom logic 111 is busy, then it enters state S28. This state starts a process that configures the internal operation registers of the custom logic 111 as well as the DATA STORAGE DEVICE controller 110. After starting the process that configures the DATA STORAGE DEVICE controller 110, the decision unit 301 will enter in state S30, which implements a configurable delay (nominally 2 milliseconds) and then the decision unit 301 proceeds to state S0 to wait for DATA STORAGE DEVICE commands.

Figure 9:
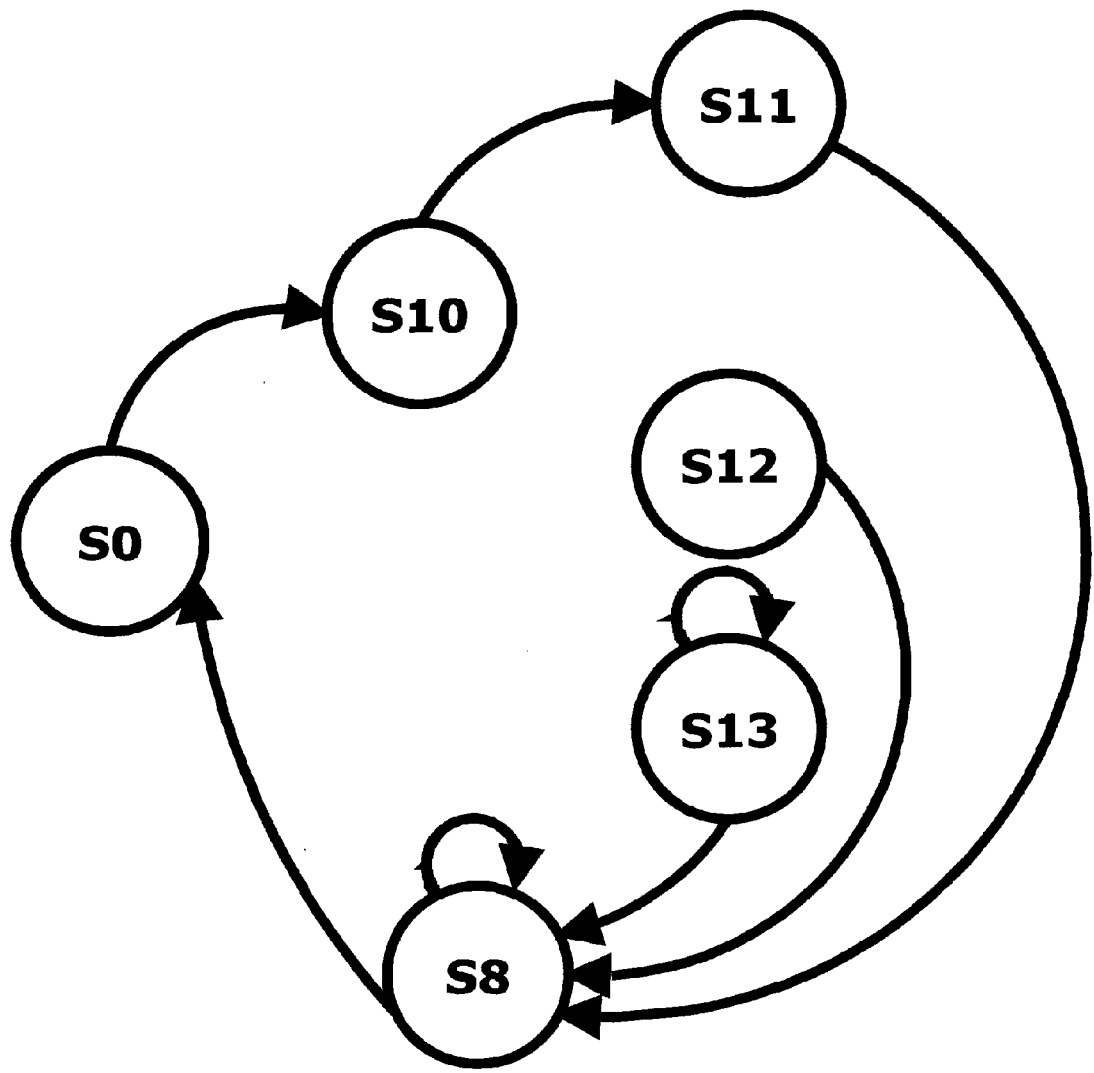
FIG. 9 is state machine diagram corresponding to the states of the decision unit 301 when receiving a NON DATA type data storage device command.

Case 4: DATA STORAGE DEVICE Non Data Commands: As depicted in the FIG. 9, the decision unit 301 waits in state S0 until a command is received through the DATA STORAGE DEVICE bus 108. If this command is one of the following: CHECK POWER MODE, FLUSH CACHE, IDLE, IDLE IMMEDIATE, INITIALIZE DEVICE PARAMETERS, READ VERIFY SECTOR(S), SEEK, SET FEATURES, SET MULTIPLE MODE, SLEEP, STANDBY, STANDBY IMMEDIATE, the decision unit will enter in state S23 where it will signal the controlling device 201 (FIG. 3) or the DATA STORAGE DEVICE to DATA STORAGE DEVICE bridge 104 (FIG. 1) that the unit entered in a busy state. Next state will be selected according to the specific command received. In case of READ VERIFY SECTOR(S) and SEEK it will enter in state S24, in case of INITIALIZE DEVICE PARAMETERS, SET FEATURES and SET MULTIPLE MODE, it will enter in state S25. For all other cases comprising the list of commands given in this paragraph, it will enter in S26. In state S26, as this are commands that can be safely omitted from operation when using the embodiments presented on this invention, the custom logic unit 111 will signal to the controlling device that it executed the command correctly and will return to state S0, going through state S8.

What is claimed is:

1. An apparatus for preventing modification and protecting of data stored in a data storage device present on a computer system in such a manner that presents an illusion/false impression that the data can be modified or be copied, the apparatus being adapted to function as a switch between an existing data storage device and a secondary data storage device, the apparatus comprising:
a local memory;
connecting data storage device controller to connect to the existing data storage device and the secondary data storage device;
a data protection logic configured to connect to the computer system such that the apparatus appears to the computer system as the existing data storage device, the data protection logic connecting to the computer system through a data storage device bus and using an internal table in the local memory, the local memory having flags indicating whether requested data of the computer system is to be retrieved from the existing data storage device or the secondary data storage device; wherein
the apparatus is configured to determine which storage device from which to retrieve the requested data using the internal table,
the local memory is configured to store the data to be written in the secondary data storage device,
the apparatus is configured to transfer data from the existing data storage device or the secondary data storage device in response to a request by the computer system, and
the apparatus is configured to function as a bridge between the computer system and the existing data storage device to pass all data through its connection without modification.

2. The apparatus according to claim 1, wherein the connection to the computer system is a data storage device interface.

3. The apparatus according to claim 2, wherein the connection to the existing data storage device and to the secondary data storage device is a data storage device interface.

4. The apparatus according to claim 3, wherein the only data storage device connected to the apparatus is the existing data storage device.

5. The apparatus according to claim 1, wherein the local memory is configured to be erased.

6. The apparatus according to claim 1, wherein the apparatus is configured to prevent modification of data by examining data retrieved from the secondary data storage device and replacing retrieved data for an arbitrary pattern, given that a pattern which is not allowed is found.

7. A method of operating an apparatus for preventing modification and protecting of data stored in a data storage device present on a computer system in such a manner that presents an illusion/false impression that the data can be modified or copied, the apparatus including a local memory, a data storage device controller and a data protection logic, and the apparatus being adapted to function as a switch between an existing data storage device and a secondary data storage device, the method comprising:
connecting the existing data storage device and the secondary data storage device;
connecting the data protection logic to the computer system through a data storage device bus and using an internal table in the local memory such that the apparatus appears to the computer system as the existing data storage device, the local memory having flags indicating whether requested data of the computer system is to be retrieved from the existing data storage device or the secondary data storage device;
receiving retrieving requests from the computer system to retrieve data;
determining which storage device from which to retrieve the requested data using the internal table,
transferring data from the existing data storage device or the secondary data storage device in response to the retrieving request from the computer system; wherein
the apparatus functions as a bridge between the computer system and the existing data storage device such that all data transmitted between the computer system and the existing storage device is transmitted without modification.

8. The method according to claim 7, further comprising:
writing received data to a second half of the existing data storage device; and
retrieving data from the first half of the existing data storage device if a requested address is not in local memory, or from the second half otherwise.

9. The method according to claim 8, further comprising:
clearing contents of the local memory.

10. The method according to claim 8, further comprising:
writing received data to the existing data storage device and reading requested data from the existing data storage device, in a manner indistinguishable from the operation of a same computer system connected directly to the existing data storage device.

11. The method according to claim 8, further comprising:
storing the internal table in the local memory, the internal table including a list of patterns that are not allowed;
searching for a byte pattern in data that is retrieved from the secondary data storage device; and
changing a found pattern on retrieved data to an arbitrary pattern before being transferred to the computer system.

* * * * *